US007571035B2

(12) United States Patent
Raichle et al.

(10) Patent No.: US 7,571,035 B2
(45) Date of Patent: *Aug. 4, 2009

(54) SIMULTANEOUS VEHICLE PROTOCOL COMMUNICATION APPARATUS AND METHOD

(75) Inventors: Kurt Raichle, Owatonna, MN (US); David Reul, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 304 days.

This patent is subject to a terminal disclaimer.

(21) Appl. No.: 11/393,672

(22) Filed: Mar. 31, 2006

(65) Prior Publication Data

US 2007/0233340 A1    Oct. 4, 2007

(51) Int. Cl.
  *G01M 17/00*    (2006.01)
(52) U.S. Cl. .............................. 701/29; 714/46; 714/725
(58) Field of Classification Search .................. 701/29, 701/35, 33; 717/168; 340/438, 439; 73/116; 714/725, 28, 30, 46, 25; *G01M 17/00*
  See application file for complete search history.

(56) References Cited

U.S. PATENT DOCUMENTS

| | | | |
|---|---|---|---|
| 4,739,323 A | 4/1988 | Miesterfeld et al. | 340/825.5 |
| 4,853,850 A | 8/1989 | Krass, Jr. et al. | 364/200 |
| 4,887,064 A | 12/1989 | Drori et al. | 340/426 |
| 4,962,456 A | 10/1990 | Abe et al. | 364/431.01 |
| 4,975,846 A | 12/1990 | Abe et al. | 364/424.03 |
| 4,975,847 A | 12/1990 | Abe et al. | 364/424.03 |
| 5,003,477 A | 3/1991 | Abe et al. | 364/424.03 |
| 5,056,023 A | 10/1991 | Abe | 364/424.03 |
| 5,132,905 A | 7/1992 | Takai et al. | 364/424.03 |
| 5,150,048 A | 9/1992 | McAuliffe et al. | 324/158 R |
| 5,319,962 A | 6/1994 | Kaminski et al. | 73/116 |
| 5,416,917 A | 5/1995 | Adair et al. | 395/500 |
| 5,459,660 A | 10/1995 | Berra | 364/424.03 |
| 5,491,418 A * | 2/1996 | Alfaro et al. | 324/402 |
| 5,555,498 A | 9/1996 | Berra et al. | 364/424.03 |
| 5,646,865 A * | 7/1997 | Alfaro et al. | 701/29 |
| 5,737,711 A | 4/1998 | Abe | 701/29 |
| 5,794,164 A | 8/1998 | Beckert et al. | 701/1 |
| 5,916,287 A | 6/1999 | Arjomand et al. | 701/29 |
| 6,073,063 A | 6/2000 | Ong et al. | 701/35 |

(Continued)

FOREIGN PATENT DOCUMENTS

JP    1210844    8/1989

(Continued)

*Primary Examiner*—Tuan C To
*Assistant Examiner*—Jack Keith
(74) *Attorney, Agent, or Firm*—Baker & Hostetler LLP

(57) ABSTRACT

A diagnostic tool for simultaneously communicating with a plurality of motor vehicle control units and implements at least two different communication protocols within a single motor vehicle. The diagnostic tool includes a processor and a field programmable gate array. The processor simultaneously executes a plurality of diagnostic routines and thereby provides messages to at least two of the plurality of motor vehicle control units. The field programmable gate array provides a selectable multiple protocol interface to simultaneously accommodating the at least two different communication protocols. The field programmable gate array is coupled between the plurality of motor vehicle control units and the processor. The selectable multiple protocol interface simultaneously converts the messages from the processor into a format readable by the selected motor vehicle control units and simultaneously converting received control unit information into a format readable by the processor.

9 Claims, 7 Drawing Sheets

U.S. PATENT DOCUMENTS

| | | | |
|---|---|---|---|
| 6,167,255 A | 12/2000 | Kennedy, III et al. | 455/414 |
| 6,181,992 B1 | 1/2001 | Gurne et al. | 701/29 |
| 6,189,057 B1 * | 2/2001 | Schwanz et al. | 710/72 |
| 6,202,008 B1 | 3/2001 | Beckert et al. | 701/33 |
| 6,526,340 B1 | 2/2003 | Reul et al. | 701/29 |
| 6,701,232 B2 | 3/2004 | Yamaki | 701/33 |
| 6,701,233 B2 * | 3/2004 | Namaky et al. | 701/33 |
| 6,920,382 B2 * | 7/2005 | Katagishi et al. | 701/33 |
| 6,947,816 B2 * | 9/2005 | Chen | 701/33 |
| 7,257,472 B2 * | 8/2007 | Hauer et al. | 701/29 |
| 2003/0014521 A1 | 1/2003 | Elson et al. | 709/225 |
| 2003/0095688 A1 | 5/2003 | Kirmuss | 382/105 |
| 2004/0093363 A1 | 5/2004 | Cargin, Jr. et al. | 708/131 |
| 2006/0041349 A1 * | 2/2006 | Chinnadurai et al. | 701/35 |
| 2007/0100520 A1 * | 5/2007 | Shah et al. | 701/33 |

FOREIGN PATENT DOCUMENTS

| | | |
|---|---|---|
| JP | 3111733 | 5/1991 |
| JP | 8136411 | 5/1996 |

* cited by examiner

| OFFSET | | | | | | | | | |
|---|---|---|---|---|---|---|---|---|---|
| 0X00 | MODE SELECTION REG. | 7 | 6 | 5 | 4 | 3 | 2 | 1 | 0 |
| | | RVE | 0 | 0 | 0 | 0 | JCS | CSPD | |
| 0X01 | TRANSMIT CONTROL REG. | 7 | 6 | 5 | 4 | 3 | 2 | 1 | 0 |
| | | ABORT | 0 | 0 | 0 | 0 | TE | TIE | |
| 0X02 | RECEIVE CONTROL REG. | 7 | 6 | 5 | 4 | 3 | 2 | 1 | 0 |
| | | ABORT | BRKIE | 0 | 0 | RE | RIE | | |
| 0X03 | INTERRUPT STATUS REG. | 7 | 6 | 5 | 4 | 3 | 2 | 1 | 0 |
| | | 0 | 0 | 0 | 0 | TERR | TIF | RERR | RIF |
| 0X04 | TRANSMIT STATUS REG. | 7 | 6 | 5 | 4 | 3 | 2 | 1 | 0 |
| | | 0 | 0 | 0 | 0 | OCF | LA | TXOR | TDRE |
| 0X05 | RECEIVE STATUS REG. | 7 | 6 | 5 | 4 | 3 | 2 | 1 | 0 |
| | | BRKR | 0 | SOFF | EODF | IBE | CRCE | RXOR | RDRF |
| 0X06 | | | | | | | | | |
| 0X07 | TX/RX REG. | | | | | | | | |
| 0X08 | | | | | | | | | |
| 0X09 | | | | | | | | | |
| 0X0A | | | | | | | | | |
| 0X0B | | | | | | | | | |
| 0X0C | | | | | | | | | |
| 0X0D | | | | | | | | | |
| 0X0E | | | | | | | | | |
| 0X0F | | | | | | | | | |

FIG. 4

SIMULTANEOUS VEHICLE PROTOCOL COMMUNICATION APPARATUS AND METHOD

FIELD OF THE INVENTION

The present invention is directed to a diagnostic tool and more specifically to a diagnostic tool for simultaneously communicating with a motor vehicle that includes multiple control units that implement at least two different communication protocols.

BACKGROUND OF THE INVENTION

Today, motor vehicles include various electronic control units mounted in the motor vehicle. The control units may control various systems and/or subsystems within the motor vehicle. For example, a control unit may control an engine, a transmission, a brake or a steering mechanism. These control units are typically coupled to a variety of sensors and/or actuators. Depending on the vehicle, the control units within a motor vehicle may implement various different communication protocols. In addition, many of these control units may operate at different voltage levels and may transmit in differential or single-ended modes.

In addition, both the U.S. Environmental Protection Agency (EPA) and the CARB have also issued regulations that require standardized programming tools to be used for all vehicle manufactures. This regulation includes requirements for reprogramming emission-related control modules in vehicles for all manufactures by the after market repair industry. In response to the requirements, the SAE has set forth a recommended practice for pass-thru vehicle programming (SAE J2534-1) to satisfy the intent of the EPA and the CARB.

An OBD II compliant vehicle can include one or more of three communication protocols; SAE J1850 variable pulse width modulation (VPWM), SAE J1850 pulse width modulation (PWM), and ISO 9141-2. Most current General Motors (GM) cars and light trucks implement the J1850 VPWM communication protocol. A majority of current Chrysler, European and Asian Import vehicles implement the ISO 9141-2 communication protocol. Most current Ford vehicles implement the J1850 PWM communication protocol. However, motor vehicles that are not OBD II compliant have implemented various other communication protocols. In addition, OBD II compliant motor vehicles may include motor vehicle control units that implement other non-OBD II compliant communication protocols.

In a typical motor vehicle when a fault occurs, that is monitored by a control unit, that fault is logged within memory. In a typical situation, a malfunction indicator light (MIL) is also lit to inform a driver of the motor vehicle that a problem exists. In attempting to trouble-shoot an indicated fault, a service technician typically connects a diagnostic tool to a diagnostic connector provided on the motor vehicle. A typical diagnostic tool includes a microcontroller and an interface circuitry to convert the electronic signals supplied by a control unit in the motor vehicle to a signal that is readily useable by the microcontroller of the diagnostic tool.

Certain diagnostic tools have included multiple hard-wired communication circuits that allowed the diagnostic tool to interpret multiple protocols from different control units. Other diagnostic tools have included a field programmable gate array (FPGA). The FPGA allowed a diagnostic technician to download different images into the FPGA, such that the FPGA could accommodate different communication protocols. In this case, the FPGA served as a communication interface between one of the motor vehicle control units and the microcontroller located in the diagnostic tool. New FPGA models have been made to allow the processor to communicate with different controls units without requiring the FPGAs to be reprogrammed. They serve as a communication interface between the motor vehicle control units and the microcontroller/processor located in the diagnostic tool. However, many motor vehicles include multiple control units that implement different communication protocols within the same motor vehicle. Nonetheless, the microcontroller/processor of the currently available FPGA can only communicate with one control unit at a time due to the different communication protocols.

Accordingly, it is necessary to have a new diagnostic tool that can allow the microcontroller/processor to simultaneously communicate with a number of control units that have different communication protocols.

SUMMARY OF THE INVENTION

The foregoing needs are met, to great extent, by the present invention, wherein in a new diagnostic tool is provided that in some embodiments it can simultaneously communicate with a plurality of motor vehicle control units that implement at least two different communication protocols.

In accordance with one embodiment of the present invention, a diagnostic tool includes a processor and a field programmable gate array (FPGA). The processor simultaneously executes a plurality of diagnostic routines and thereby provides messages to one or more the plurality of motor vehicle control units. In turn, each of the plurality of diagnostic routines corresponds to a selected motor vehicle control unit. The FPGA provides a selectable multiple protocol interfaces to simultaneously accommodate at least two different communication protocols. The FPGA is coupled between the plurality of motor vehicle control units and the processor. The selectable multiple protocol interface simultaneously converts messages from the processor into motor vehicle control unit readable formats and simultaneously converts received control unit information into a processor readable format. The diagnostic tool also includes a selectable signal translator that couples between the plurality of motor vehicle control units and the FPGA.

In accordance with another embodiment of the present invention, a method of simultaneously providing diagnostic capability for a plurality of motor vehicle control units within a single motor vehicle, the plurality of motor vehicle control units utilizing at least two different communication protocols, the method includes the steps of: receiving an indication of a diagnostic routine to be executed, selecting at least two channel modules for simultaneously communicating with the selected motor vehicle control units, enabling at least two of the plurality of communication protocols of the selected channel modules, simultaneously providing messages from the processor to the selected motor vehicle control units by providing a selectable multiple protocol interface to accommodate at least two different communication protocols, and simultaneously providing control unit information from the selected motor vehicle control units to the processor in a format readable by the processor. In the step of receiving an indication of a diagnostic routine to be executed, the diagnostic routine being applicable to selected at least two motor vehicle control units. In the step of selecting at least two channel modules for simultaneously communicating with the selected motor vehicle control units, the channel modules includes a plurality of communication protocols. In the step of simultaneously providing messages from the processor to the selected motor vehicle control units by providing a selectable multiple protocol interface to accommodate at least two different communication protocols, the messages being provided is in a format that is readable by the selected motor vehicle control units.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this aspect, before explaining at least one embodiment of the invention in detail, it is to be understood that the invention is not limited in its application to the details of the construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regard as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a diagram of the control and status registers for the J1850 communication protocol module of FIG. 3, according to an embodiment of the present invention.

DETAILED DESCRIPTION OF THE INVENTION

Figure 1A:
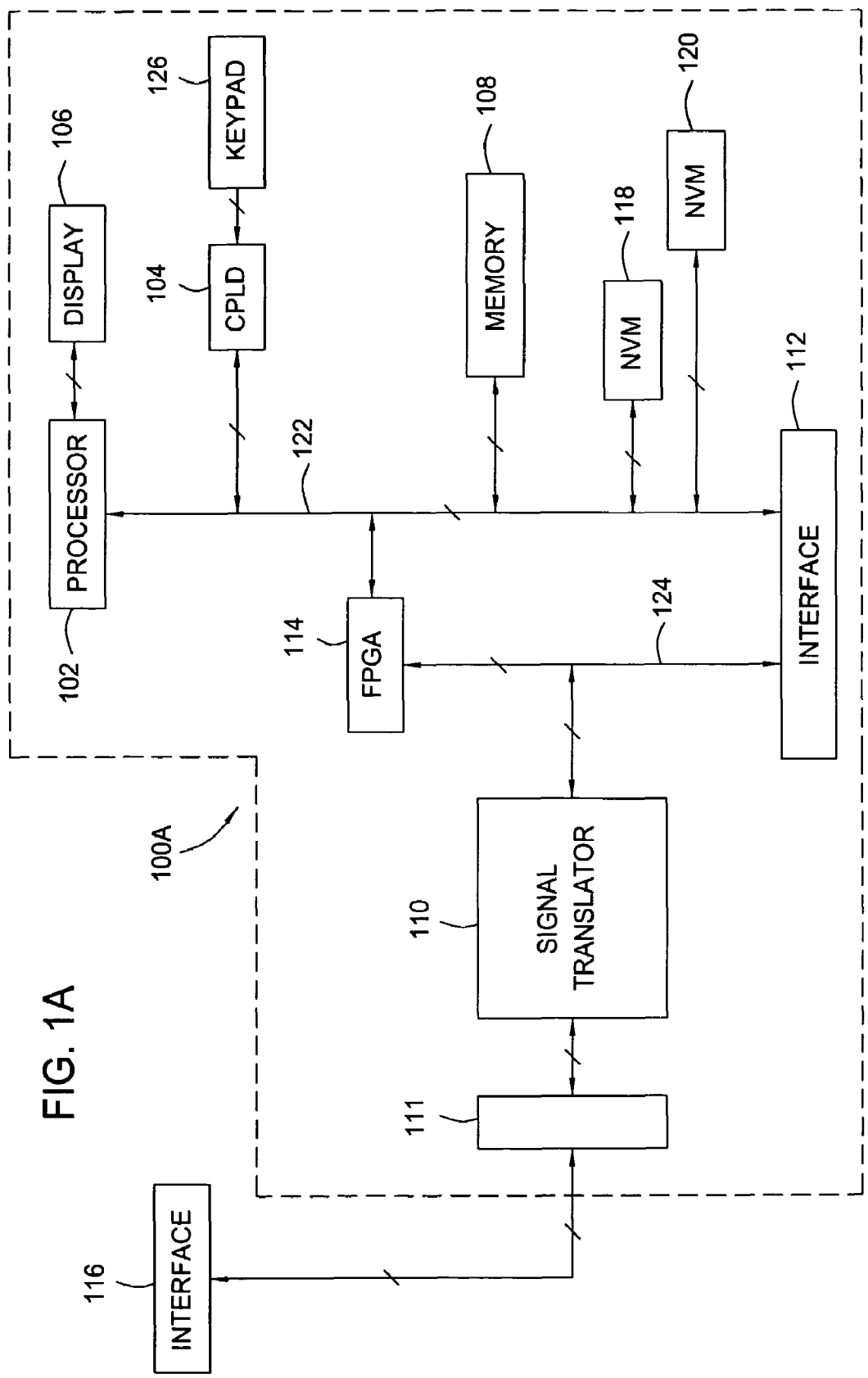
FIG. 1A is a block diagram of a diagnostic tool, according to an embodiment of the present invention.

The invention will now be described with reference to the drawing figures, in which like reference numerals refer to like parts through. An embodiment in accordance with the present invention provides a diagnostic tool configured to allow the microcontroller/processor to simultaneously communicate with a number of control units that have different communication protocols. By allowing the processor to simultaneously communicate with more than one motor vehicle control units, one can better diagnose a vehicle for problems.

A diagnostic tool, embodying the present invention, provides a multi-vehicle communication interface that is able to simultaneously communicate with at least two communication protocols. The multi-vehicle communication interface provides interface logic for on-board diagnostics (OBD) I, OBD II and enhanced OBD II vehicles, and other communication protocols. An embodiment of the present invention includes a logic device that may have eight modules as is shown in FIG. 2. The disclosed examples of modules are configured such that they can selectively implement multiple communication protocols. For example, a J1850 channel module handles either a PWM or a VPWM communication protocol. Grouping similar communication protocols within a single module allows conversion circuitry that is common to the grouped communication protocols to be shared.

FIG. 1A is a block diagram of a diagnostic tool, according to an embodiment of the present invention. In FIG. 1A, a diagnostic tool 100A according to an embodiment of the present invention includes a processor 102, a field programmable gate array (FPGA) 114, a system bus 124, a display 106, a complex programmable logic device (CPLD) 104, a keypad 126, a memory subsystem 108, an internal non-volatile memory 118, an external non-volatile memory 120, a system bus 122, a hardware interface port 112, a selectable signal translator 110, and a connector 111 coupled as shown in FIG. 1A. Interface 116 is in communication with the diagnostic tool 100B through connector 111 via external cable.

Selectable signal translator 110 is coupled to a motor vehicle communication interface 116 through an external cable (not shown) that is motor vehicle dependent. Translator 110 conditions signals received from a motor vehicle control unit through the communication interface 116 to a conditioned signal compatible with diagnostic tool 100. For example, the J1850 VPWM standard requires a high level signal to be between 4.25 and 20 volts and a low level signal to be between ground and 3.5 volts. In a typical 3.3 volt implementation, diagnostic tool 100 would require a high level signal to be between about 2.64 and 3.3 volts and a low level signal to be between ground and about 0.66 volts. Thus, in this case, translator 110 translates a received signal to a voltage level appropriate for diagnostic tool 100. In a similar manner, translator 110 can simultaneously translates multiple signals that are being transmitted from diagnostic tool 100 to motor vehicle control units, to an appropriate voltage level. If desired, translator 110 can be designed to condition multiple signals in ways other than voltage translation (e.g., filtering a signal). Furthermore, translator 110 can simultaneously condition, for example, at least two of the following signals: J1850 signal, ISO 9141-2 signal, communication collision detection (CCD) (e.g., Chrysler collision detection), data communication links (DCL), serial communication interface (SCI), S/F codes, a solenoid drive, J1708, RS232, controller area network (CAN), a 5 volt I/O, a diagnostic enable and an A/D converter. The translator 110 can also translate any other communication protocols that are implemented in a vehicle.

Circuitry for translating a signal from one voltage level to another is well known to those of ordinary skill in the art. In the present embodiment, translator 110 includes circuitry to simultaneously translate at least two signal voltage levels currently implemented within a motor vehicle. As such, the circuitry to translate a particular communication protocol's voltage levels is selected by FPGA 114 (e.g., by tri-stating unused transceivers) or by providing a keying device that plugs into a connector 111 that is provided by diagnostic tool 100 to connect diagnostic tool 100 to vehicle communication interface 116.

Translator 110 is also coupled to FPGA 114 and hardware interface port 112 via bus 124. FPGA 114 transmits to and receives signals (i.e., messages) from a motor vehicle control unit through translator 110. FPGA 114 simultaneously provides appropriate signals to translator 110 so that received signals (e.g., data) or transmitted signals (e.g., a command) are translated, as previously discussed above, according to the communication protocol implemented by the motor vehicle control units.

FPGA 114 is coupled to processor 102 through various address, data and control lines by the system bus 122. FPGA 114 is also coupled to hardware interface port 112 through bus 124. As is discussed in more detail below, FPGA 114 simultaneously provides multiple communication protocol interfaces between processor 102 and motor vehicle control units. In one embodiment, FPGA 114 is a Altera 1OK50E, Altera 10K30E, or a Altera Cyclone EP1C3 manufactured by Altera Corporation. The multiple communication protocol interface converts messages (e.g., data) from communication protocols implemented by motor vehicle control units into a processor readable format. In this manner, processor 102 can read error codes from motor vehicle control units and provide test signals to motor vehicle control units such that various actuators and/or sensors within a motor vehicle can be tested simultaneously. Hardware interface port 112 provides a port from which various legacy diagnostic programs, other information or data, can be downloaded.

Processor 102 is also coupled to a display 106 and to CPLD 104 through system bus 122. Processor 102 is programmed to provide output to a user through display 106 and receive input from the user through a keypad 126, or it could be some other input device such as a mouse or any other suitable input device. Display 106 may be a Liquid Crystal Display (LCD) type display, a Video Graphic Array (VGA) type display, a touch screen type display or the like. The LCD may show letters and numbers. A Video Graphics Array (VGA) display will be able to show images. The display 106 may include a LCD screen, a VGA screen, or a combination of both. The keypad 126 may also be other forms of input device such as a mouse or a stylus. The keypad 126 may include alpha numeric keys for input purposes. Processor 102 runs selected communication routines to communicate with selected motor vehicle control units. In one of the embodiments, processor 102 is a MPC823 manufactured by the Motorola Corporation. CPLD 104 is also coupled to keypad 126. CPLD 104 provides logic for decoding various inputs from the user of diagnostic tool 100 (through keypad 126) and also provides glue-logic for various other interfacing tasks.

Memory subsystem 108, internal non-volatile memory 118 and external non-volatile memory 120 are coupled to system bus 122. Memory subsystem 108 includes an application dependent amount of dynamic random access memory (DRAM) and read only memory (ROM). Internal non-volatile memory 118 and external non-volatile memory 120 can be an electrically erasable programmable read-only memory (EEPROM), flash ROM, or other similar memory. Internal non-volatile memory 118 can provide, for example, storage for boot code, self-diagnostics, various drivers and space for FPGA images, if desired. External non-volatile memory 120 can provide, for example, storage of updated programs or data (e.g., diagnostic trouble codes (DTCs)). If less than all of the modules are implemented in FPGA 114, memory 118 and/or memory 120 can contain downloadable images so that FPGA can be reconfigured for a different group of communication protocols.

Figure 1B:
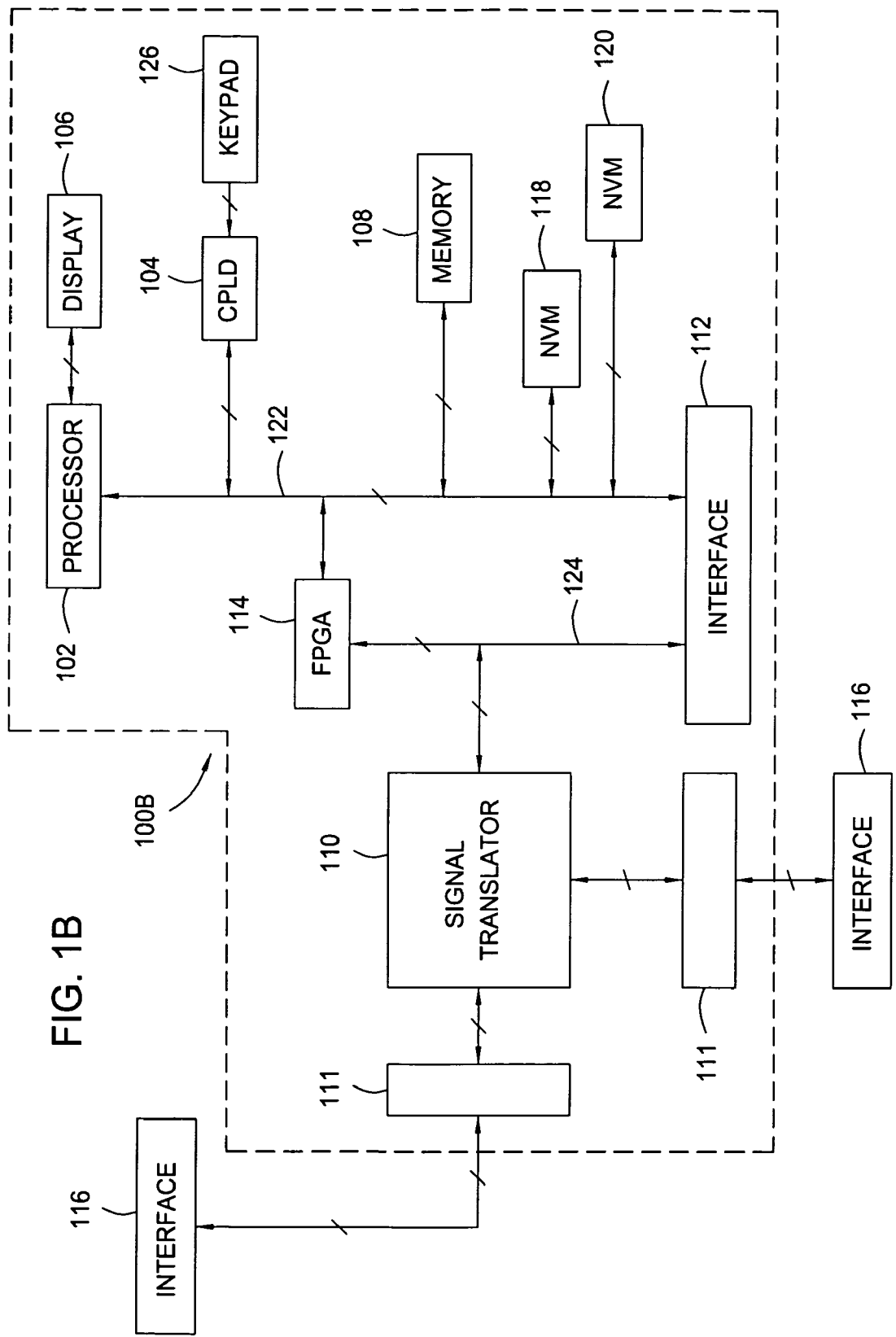
FIG. 1B is a block diagram of a diagnostic tool, according to another embodiment of the present invention with an additional connector and an interface.

FIG. 1B is a block diagram of a diagnostic tool, according to another embodiment of the present invention with an additional connector and an interface. In FIG. 1B, a diagnostic tool 100B according to another embodiment of the present invention includes a processor 102, a field programmable gate array (FPGA) 114, a bus 124, a display 106, a complex programmable logic device (CPLD) 104, a keypad 126, a memory subsystem 108, an internal non-volatile memory 118, an external non-volatile memory 120, a hardware interface port 112, a system bus 122, a selectable signal translator 110, and two connectors 111 coupled as shown in FIG. 1B. Interfaces 116 are in communication with the diagnostic tool 100B through connectors 111 via external cables.

Diagnostic tool 100B is similar to diagnostic tool 100 with the exception of having additional connectors 111 to allow the signal translator 110 to simultaneously communicate with one or more interfaces 116. Here, selectable signal translator 110 is coupled to a number of motor vehicle communication interfaces 116 through external cables (not shown) that are motor vehicle dependent. Translator 110 conditions signals received from motor vehicle control units to conditioned signals compatible with diagnostic tool 100B. Translator 110 can simultaneously translates multiple signals that are being transmitted from diagnostic tool 100B to motor vehicle control units. If desired, translator 100B can be designed to condition multiple signals in ways other than a voltage translation (e.g., filtering a signal). Furthermore, translator 110 can simultaneously condition at least two of the following signal examples: J1865 signals, ISO 9141-2 signals, communication collision detection (CCD), data communication Link (DCL), serial communication interface (SCI), S/F codes, a solenoid drive, J1708, RS232, controller area network (CAN), a 5 volt I/O, a diagnostic enable and an A/D converter. This translator 110 can also translate any other communication protocols that are implemented in a vehicle.

Circuitry for translating a signal from one voltage level to another is well known to those of ordinary skill in the art. In the present embodiment, translator 110 includes circuitry to simultaneously translate at least two signal voltage levels currently implemented within a motor vehicle. As such, the circuitry to translate a particular communication protocol's voltage levels is selected by FPGA 114 (e.g., by tri-stating unused transceivers) or by providing keying devices that plugs into connectors 111 that are provided by diagnostic tool 100B to connect diagnostic tool 100B to vehicle communication interfaces 116.

Translator 110 is also coupled to FPGA 114 and hardware interface port 112 via bus 124. FPGA 114 transmits to and receives signals (i.e., messages) from motor vehicle control units through translator 110. FPGA 114 simultaneously provides appropriate signals to translator 110 so that the received signals (e.g., data) or the transmitted signals (e.g., commands) are translated, as previously discussed above, according to the communication protocols implemented by the motor vehicle control units.

Figure 1C:
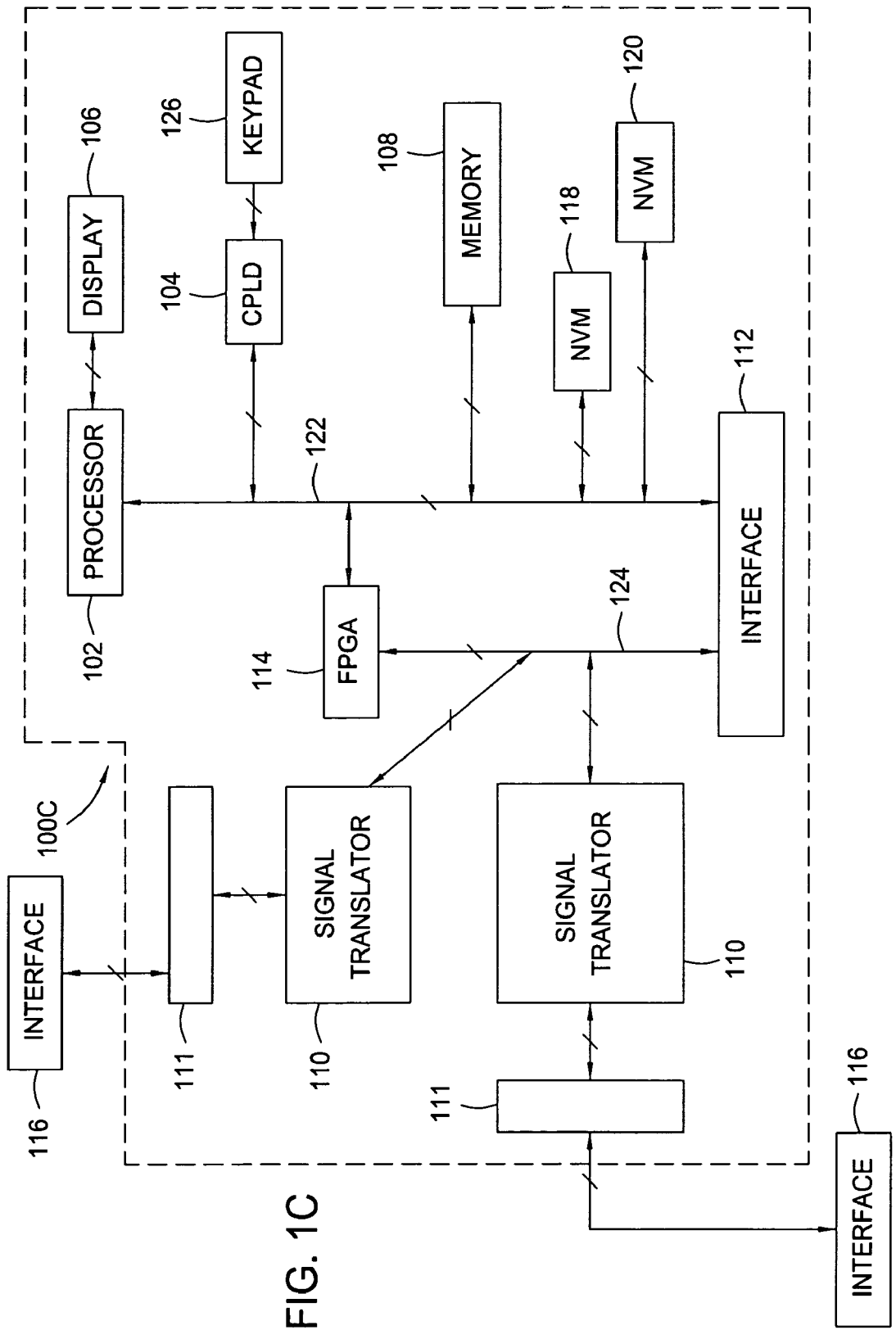
FIG. 1C is a block diagram of a diagnostic tool, according to another embodiment of the present invention with multiple signal transmitters and interfaces.

FIG. 1C is a block diagram of a diagnostic tool, according to another embodiment of the present invention with multiple signal transmitters and interfaces. In FIG. 1C, a diagnostic tool 100C according to another embodiment of the present invention includes a processor 102, a field programmable gate array (FPGA) 114, a bus 124, a display 106, a complex programmable logic device (CPLD) 104, a keypad 126, a memory subsystem 108, an internal non-volatile memory 118, an external non-volatile memory 120, a hardware interface port 112, a system bus 122, two multiple selectable signal translators 110, two connectors 111 coupled as shown in FIG. 1C. Interfaces 116 are in communication with the diagnostic tool 100C through connectors 111 via external cables.

Diagnostic tool 100C is similar to diagnostic tools 100 and 100B with the exception of having an additional signal translator 110 in communication with FPGA 114 and an additional connector 111 to allow the signal translator 110 to simultaneously communicate with more than one interface 116.

These additional interfaces 116 can be located at various locations of a vehicle depending on the make and model of the vehicle. For example, these interfaces may be found under the dash board, in the hood, or inside the trunk. By having multiple signal translators 110 and connectors 111, one can connect various interfaces with the diagnostic tools 100C to simultaneously diagnose problems within the vehicle.

As discussed above, the selectable signal translators 110 are coupled to motor vehicle communication interfaces 116 through external cables (not shown) that are motor vehicle dependent. Translators 110 can simultaneously condition signals received from motor vehicle control units to conditioned signals compatible with diagnostic tool 100C. Translators 110 can simultaneously translate multiple signals that are being transmitted from diagnostic tool 100C to motor vehicle control units. If desired, translator 110 can be designed to condition multiple signals in ways other than a voltage translation (e.g., filtering a signal). Furthermore, translator 100C can simultaneously condition with at least two of the following signals: J1865 signals, ISO 9141-2 signals, communication collision detection (CCD), data communication Link (DCL), serial communication interface (SCI), S/F codes, a solenoid drive, J1708, RS232, controller area network (CAN), a 5 volt I/O, a diagnostic enable and an A/D converter. The translator 110 can also translate any other communication protocols that are implemented in a vehicle.

Circuitry for translating a signal from one voltage level to another is well known to those of ordinary skill in the art. In the present embodiment, translator 110 includes circuitry to simultaneously translate at least two signal voltage levels currently implemented within a motor vehicle. As such, the circuitry to translate a particular communication protocol's voltage levels is selected by FPGA 114 (e.g., by tri-stating unused transceivers) or by providing keying devices that plugs into connectors 111 that are provided by diagnostic tool 100C to connect diagnostic tool 100C to vehicle communication interfaces 116.

Translator 110 is also coupled to FPGA 114 and hardware interface port 112 via bus 124. FPGA 114 transmits to and receives signals (i.e., messages) from motor vehicle control units through translator 110. FPGA 114 simultaneously provides appropriate signals to translator 110 so that the received signals (e.g., data) or the transmitted signals (e.g., commands) are translated, as previously discussed above, according to the communication protocols implemented by the motor vehicle control units.

Figure 2A:
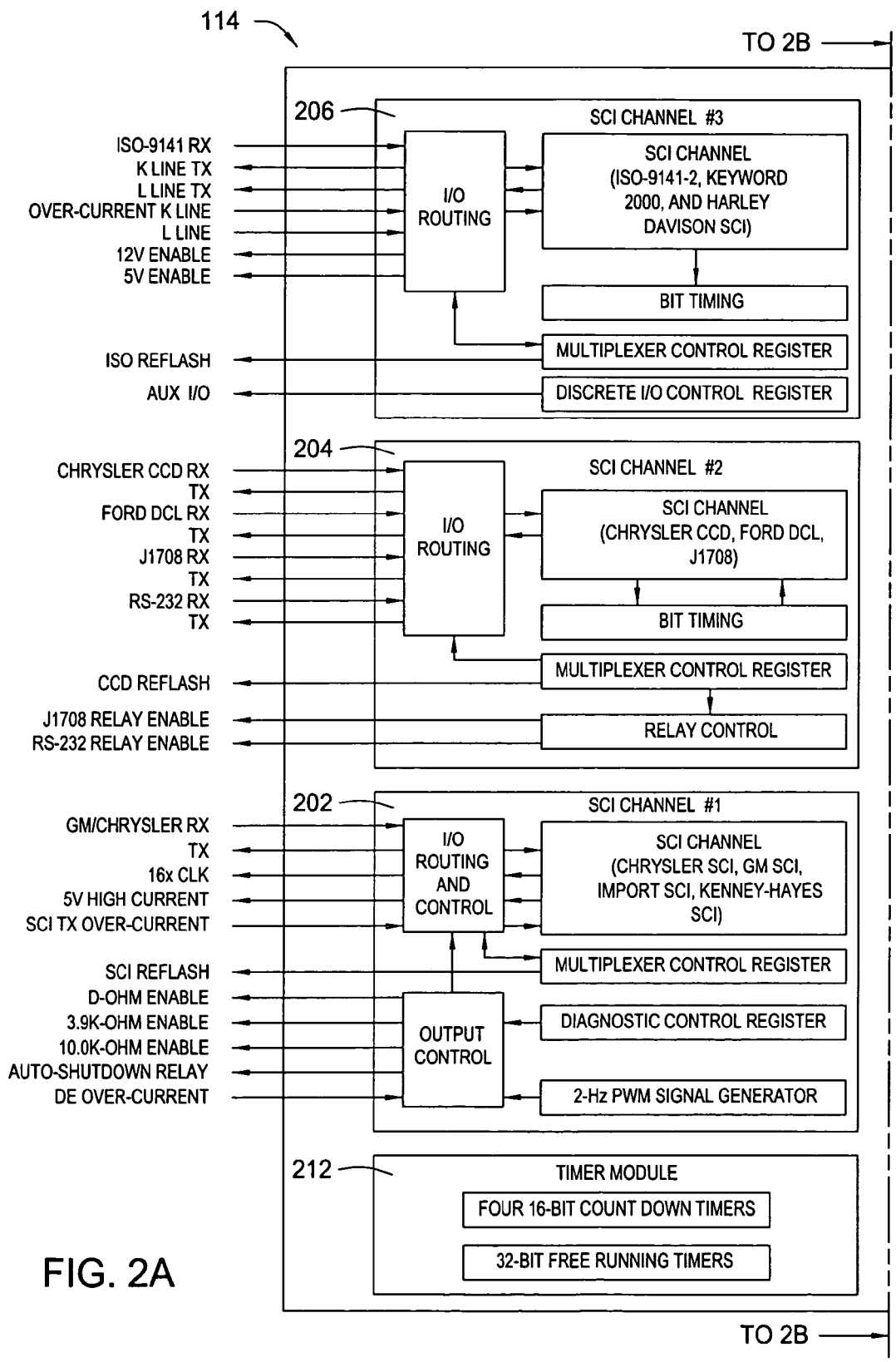
FIG. 2 is a block diagram of a logic device implementing various communication protocol modules, according to an embodiment of the present invention.
Figure 2B:
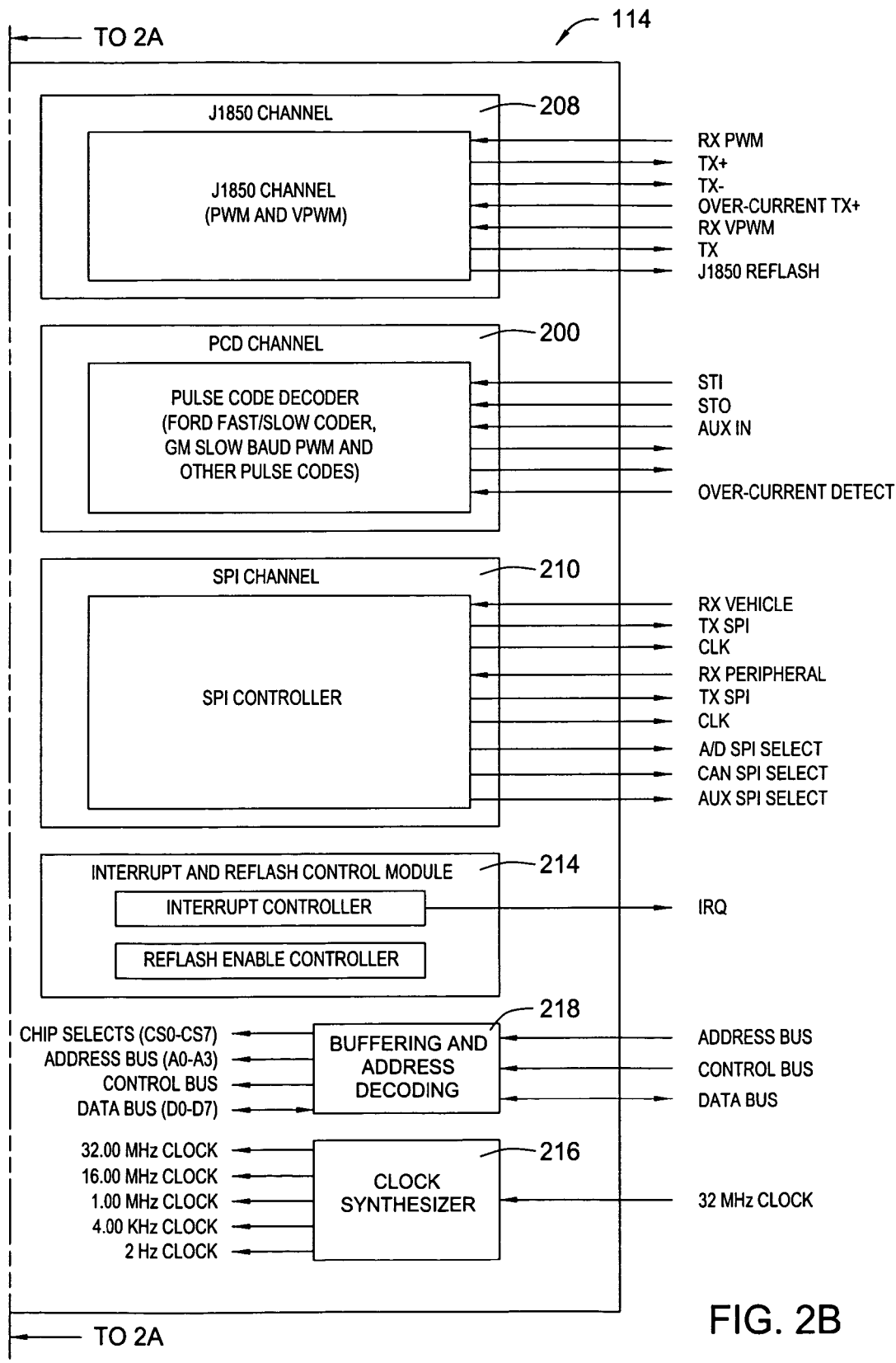

FIG. 2 is a block diagram of a logic device implementing various communication protocol modules, according to an embodiment of the present invention. FIG. 2 depicts FPGA 114, which includes eight modules, according to an embodiment of the present invention. FIG. 2A includes a SCI channel #3 206, a SCI channel #2 204, a SCI channel #1 202 and a timer module 212. FIG. 2B includes a J1850 channel 208, PCD channel 200, a SPI channel 210, an interrupt and reflash control module 214, a buffering and address decoding 218, and a clock synthesizer 216.

In FIG. 2A, a first module 206, is SCI channel # 3 for ISO 9141, Ford 9141, Keyword 2000, and Harley-Davidson SCI vehicle communication. A second module 204, is SCI channel # 2 for Chrysler collision detection, Ford data communications link (DCL), heavy duty J1708 and RS232 vehicle communications. The third module 202, is serial communication interface (SCI) channel #1 for generic GM, Chrysler and Import SCI vehicle communications. A fourth module 212 provides multiple timers for the timing of various vehicle communications.

In FIG. 2B, a fifth module 208, provides a J1850 channel for PWM and variable pulse width modulation (VPWM) vehicle communication. A sixth module 200, a pulse code decoder (PCD) channel module, includes a PCD for GM slow baud pulse width modulation (PWM), Ford fast and slow pulse codes and for Import pulse code protocols. A seventh module 210 is a serial peripheral interface (SPI) channel module to communicate with an analog-to-digital (A/D) converter, a controller area network (CAN) interface and Import SPI vehicles.

An eighth module 214, is an interrupt and reflash control module, which provides for enabling and disabling the interface's global interrupt and provides the capability of performing reflash operations, on a memory within a motor vehicle. In addition, FPGA 114 includes a clock synthesizer 216, as well as, various buffers and logic for address decoding 218.

Implementing multiple modules within one logic device such as FPGA 114, provides a comprehensive interface that can accommodate multiple communication protocols found in many motor vehicles. As disclosed herein, each module has a corresponding block of sixteen 8-bit address locations. These address locations (registers) allow a user to program a module for a desired communication protocol. Additionally, the FPGA can have additional modules as needed to communicate in various protocols.

While the present embodiment includes eight modules, the discussion herein is limited to the fifth module 208. All other communication protocol modules are implemented in a similar fashion as will be readily apparent to those of ordinary skill in the art. As configured, module 208 handles J1850 communication for the VPWM (GM and Chrysler) and PWM (Ford) protocols.

Figure 3:
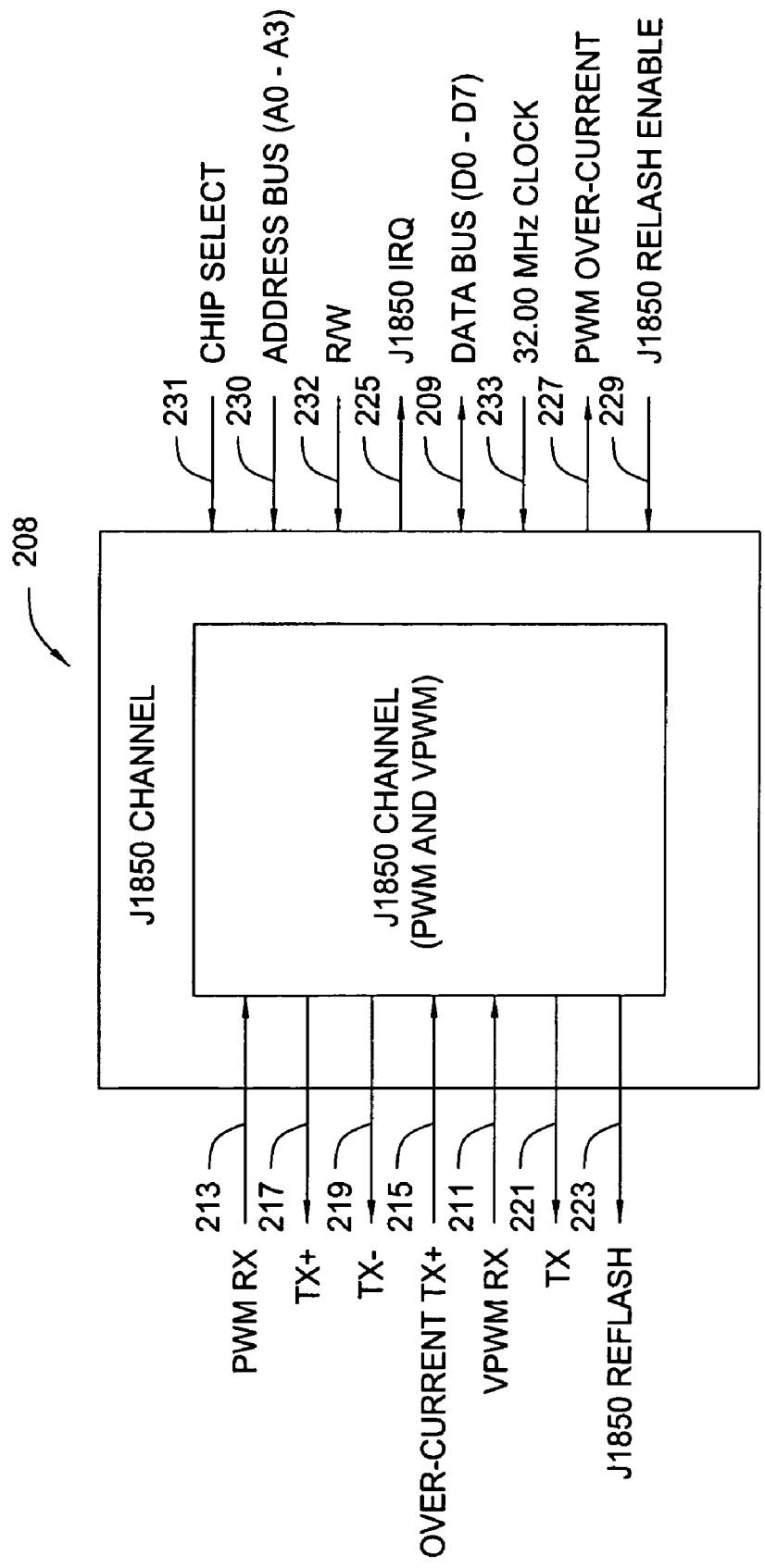
FIG. 3 is a block diagram of a J1850 communication protocol module, according to an embodiment of the present invention.

FIG. 3 is a block diagram of a J1850 communication protocol module, according to an embodiment of the present invention. Information is provided to J1850 channel module 208 across a data bus 209 (D0-D7), a VPWM receive line 211 (VPWM RX), a PWM receive line 213 (PWM RX) and an over-current transmit (TX+) line 215. The J1850 channel module 208 transmits data to a motor vehicle control unit across the differential transmission lines 217 and 219 (PWM TX+ and PWM TX–, respectively) when programmed for PWM mode. When programmed for a VPWM mode, J1850 channel module 208 transfers information over a VPWM transmission line 221 (VPWM TX).

J1850 channel module 208 also provides a J1850 reflash signal on line 223, a J1850 interrupt request (IRQ) signal on line 225 and a PWM over-current signal on line 227. J1850 channel module 208 also receives a J1850 reflash enable signal on line 229. When addressed over an address bus 230 (A0-A3) and enabled by the chip select line 231, J1850 channel module 208 either provides or receives information across the data lines 209 (D0-D7). This is determined by the state of a read/write (R/W) line 232. A clock input line 233 supplies 32 MHz clock pulses to module 208.

FIG. 4 is a diagram of the control and status registers for the J1850 communication protocol module of FIG. 3, according to an embodiment of the present invention. This illustrates the address map of the J1850 channel module 208. A mode selection register is located at address offset 0X00. A transmit control register is located at address offset 0X01. A receive control register is located at address offset 0X02. An interrupt status register is located at address offset 0X03. A transmit status register is located at address offset 0X04. A receive status register is located at address offset 0X05. A transmit/receive (TX/RX) register is located at address offset 0X07. Each of these registers, which in the disclosed embodiment are 8-bit registers, is further described below.

The mode selection register controls the operational mode of the J1850 channel module. When bit 7 (RYE) of the mode selection register is high, the reflash voltage is enabled. When bit 7 of the mode selection register is low, the reflash voltage is disabled. If bit 2 (JCS) of the mode selection register is high, the VPWM protocol is selected. If bit 2 of the mode selection register is low, the PWM protocol is selected. Bit 0 and bit 1 (CSPD) of the mode selection register determine the communication speed. If both bits 0 and 1 of the mode selection register are high, the speed is set to a multiple of four. If bit 1 of the mode selection register is high, the speed is set to a multiple of two. If bit 0 of the mode selection register is high, the speed is set to a multiple of one. For PWM, this corresponds to a baud rate of 41.6 k. For VPWM, this corresponds to a baud rate of 10.4 k. When both bits 1 and 0 of the mode selection register are low, communication is disabled. Writing to the mode selection register performs an internal reset operation. That is, all of the registers are reset to their power-on reset state.

The transmit control register controls transmit operations. When bit 7 (ABORT) of the transmit control register is high, all transmit operations are aborted. Setting bit 6 (BRKIE) of the transmit control register high causes a brake character to be sent. Any transmit or receive operation that is currently in progress will complete before the brake character is sent. Bit 6 of the transmit control register is reset low only after the brake character has been transmitted or an abort control bit has been set high.

Bits 2 and 3 (TE) of the transmit control register determine how a transmit operation is performed. If both bits 2 and 3 are low, no transmit operation is in progress. When bit 2 is high, a normal transmit operation is to be performed. When bit 3 is high, an in-frame response (IFR) is sent without a CRC (cyclic redundancy check) bit. The IFR provides a platform for remote receiving nodes to actively acknowledge a transmission. The remote receiving node appends a reply to the end of the transmitting nodes original message frame. IFRs allow for increased efficiency in transmitting messages since the receiving node may respond within the same message frame that the request originated.

When both bits 2 and 3 are high, an in-frame response is sent with a CRC bit. Bits 2 and 3 are only reset after the transmit operation is complete, the abort control bit is set high or if arbitration is lost during data transmission. Bits 0 and 1 (TIE) of the transmit control register dictate whether an interrupt is generated. If bits 0 and 1 are low, no interrupt is generated. If bit 0 is high, an interrupt is generated when the transmit FIFO buffer is not full. If bit 1 is high, an interrupt is generated when the transmit FIFO buffer contains fewer than eight bytes. If bits 0 and 1 are high, an interrupt is generated when an EOD (end-of-data) character is transmitted.

The receive control register dictates how receive operations are handled. Setting bit 7 (ABORT) of the receive control register high aborts all receive operations. Bit 6 (BRKIE) of the receive control register dictates how an interrupt is handled. If bit 6 is high, an interrupt is generated when a brake character is received. If bit 6 is low, no interrupt is generated when a brake character is received. Bits 2 and 3 (RE) of the receive control register determine how or whether a receive operation is enabled. If bits 2 and 3 are low, no receive operation is in progress. If bit 2 is high, a normal receive operation is to be performed. If bit 3 is high, an in-frame response is received without a CRC bit. If both bits 2 and 3 are high, an in-frame response is received with a CRC bit. Bits 0 and 1 (RIE) dictate how a receive interrupt is handled. If bits 0 and 1 are high, an interrupt is generated when a EOD character is received. If bit 1 is high and bit 0 is low, an interrupt is generated when the receive FIFO buffer contains four or more bytes. When bit 0 is high, an interrupt is generated when the receive FIFO buffer is not empty. If bits 0 and 1 are low, no interrupt is generated.

In the disclosed embodiment, there are three 8-bit read-only registers which report the status of the J1850 channel. The first register reports the interrupt status of the J1850 channel. The second and third registers report the status of any transmit and receive operations, respectively.

The interrupt status register provides various status information. If bit 3 (TERR) of the interrupt status register is high, a transmit error has occurred. If bit 2 (TIF) of the interrupt status register is high, a transmit interrupt has been generated. If bit 1 (RERR) of the interrupt status register is high, a receive error has occurred. If bit 0 (RIF) of the interrupt status register is high, a receive interrupt has been generated.

The transmit status register also provides various status information. If bit 3 (OCF) of the transmit status register is high, the external vehicle interface circuitry has detected an over-current condition. In response to the over-current condition, the JCS field (bit 2) of the mode selection register is set low (to disable the appropriate transmitting output). If bit 2 (LA) of the transmit status register is high, arbitration was lost during transmission. If bit 1 (TXOR) of the transmit status register is high, a byte was written to the transmit buffer while it was full. If bit 0 (TDRE) of the transmit status register is high, the transmit buffer is empty.

The receive status register also provides various information. If bit 7 (BRKR) of the receive status register is high, a break character was detected. If bit 5 (SOFF) of the receive status register is high, the byte currently stored in the receive buffer was the first byte after the start-of-frame (SOF) bit character. If bit 4 (EODF) of the receive status register is high, the previously stored byte was the last byte of the message. If bit 3 (IBE) of the receive status register is high, an invalid bit was detected during reception. If bit 2 (CRCE) of the receive status register is high, an invalid CRC was detected during operation. If bit 1 (RXOR) of the receive status register is high, an overrun occurred in the receive buffer. If bit 0 (RDRF) of the receive status register is high, the receive buffer is not empty.

The transmit/receive (TX/RX) register is used for transmitting and receiving 8-bit characters. The transmit/receive data register is formed from a 8-bit by 32 byte FIFO. A 2-bit wide by 32-bit deep FIFO is used to hold SOF and EOD status information. Thus, register allocation for J1850 channel module 208, according to an embodiment of the present invention, has been described. One skilled in the art will readily appreciate that various other information could be provided and/or other control bits could be implemented within the logic module.

The J1850 channel module 208 has been configured such that it can selectively implement multiple communication protocols. Specifically, the J1850 channel module can handle either PWM or VPWM communication protocols. Similar communication protocols are typically grouped within the other modules of FPGA 114 such that conversion circuitry common to the grouped communication protocols can be shared. Utilizing multiple modules such as modules 200, 202, 204, 206, 208, 210, 212, 214, 216 and 218 all contained in the FPGA 114, allows the user to advantageously and simultaneously diagnose vehicles that implement multiple communication protocols within the same vehicle.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for simultaneously communicating with a plurality of motor vehicle control units within a single motor vehicle, comprising:
   a processor for simultaneously executing a plurality of diagnostic routines and thereby providing messages to at least two of the plurality of motor vehicle control units, the plurality of motor vehicle control units implementing at least two different communication protocols, wherein each of the plurality of diagnostic routines corresponds to a selected motor vehicle control unit; and
   a field programmable gate array providing a selectable multiple protocol interface to simultaneously accommodating the at least two different communication protocols, the field programmable gate array coupled between the plurality of motor vehicle control units and the processor, the selectable multiple protocol interface simultaneously converting the messages from the processor into a format readable by the selected motor vehicle control units and simultaneously converting received control unit information into a format readable by the processor.

2. The diagnostic tool of claim 1, further comprising:
   a first selectable signal translator coupled between the plurality of motor vehicle control units and the field programmable gate array, the selectable signal translator conditioning the messages from the processor or the control unit information from the selected motor vehicle control units to a conditioned signal compatible with the selected motor vehicle control units or the processor, respectively.

3. The diagnostic tool of claim 1, further comprising:
   a non-volatile memory coupled to the processor, the non-volatile memory storing the diagnostic routines for the selected motor vehicle control units which respond to receive the messages from the processor and to transmit the control unit information to the processor in response to the messages.

4. The diagnostic tool of claim 1, further including:
   at least one input coupled to the processor for receiving input data from a user, the user initiating one of the diagnostic routines by entering a selection; and
   a display coupled to the processor for displaying the results provided by the initiated diagnostic routine.

5. The diagnostic tool of claim 1, wherein the selectable multiple protocol interface is a J1850 channel module that includes conversion circuitry for J1850 variable pulse width modulation (VPWM) and J1850 pulse width modulation (PWM) communication protocols.

6. A diagnostic tool for simultaneously communicating with a plurality of motor vehicle control units within a single motor vehicle, comprising:
   a means for processing for simultaneously executing a plurality of diagnostic routines and thereby providing messages to at least two of the plurality of motor vehicle control units, the plurality of motor vehicle control units implementing at least two different communication protocols, wherein each of the plurality of diagnostic routines corresponds to a selected motor vehicle control unit; and
   a field programmable gate array providing a selectable multiple protocol interface to simultaneously accommodating the at least two different communication protocols, the field programmable gate array coupled between the plurality of motor vehicle control units and the means for processing, the selectable multiple protocol interface simultaneously converting the messages from the means for processing into a format readable by the selected motor vehicle control units and simultaneously converting received control unit information into a format readable by the means for processing.

7. The diagnostic tool of claim 6, further comprising:
   a first means for signal translating coupled between the plurality of motor vehicle control units and the field programmable gate array, the first means for signal translating conditioning the messages from the means for processing or the control unit information from the selected motor vehicle control units to a conditioned signal compatible with the selected motor vehicle control units or the means for processing, respectively.

8. The diagnostic tool of claim 6, further comprising:
   means for storing the diagnostic routines for the selected motor vehicle control units which respond to receive the messages from the means for processing and to transmit the control unit information to the means for processing in response to the messages.

9. The diagnostic tool of claim 6, further including:
   at least one means for receiving input data from a user, the user initiating one of the diagnostic routines by entering a selection; and
   a means for displaying the results provided by the initiated diagnostic routine.

* * * * *